United States Patent [19]
Brown

[11] Patent Number: 6,064,760
[45] Date of Patent: May 16, 2000

[54] METHOD FOR RIGOROUS RESHAPING OF STEREO IMAGERY WITH DIGITAL PHOTOGRAMMETRIC WORKSTATION

[75] Inventor: Roger Brown, Gaithersburg, Md.

[73] Assignee: The United States Corps of Engineers as represented by the Secretary of the Army, Washington, D.C.

[21] Appl. No.: 09/259,909

[22] Filed: Mar. 1, 1999

Related U.S. Application Data

[63] Continuation-in-part of application No. 08/856,430, May 14, 1997.
[51] Int. Cl.[7] .................................................. G06K 9/00
[52] U.S. Cl. ........................... 382/154; 345/425; 348/47; 382/285; 382/289; 382/294
[58] Field of Search .............................. 356/12; 345/419, 345/425, 427, 436; 348/42, 47, 580; 382/106, 154, 285, 289, 294; 396/324, 325

[56] References Cited

U.S. PATENT DOCUMENTS

| | | | |
|---|---|---|---|
| 4,539,701 | 9/1985 | Galbreath et al. | 382/154 |
| 4,708,472 | 11/1987 | Hormann | 356/2 |
| 5,309,522 | 5/1994 | Dye | 382/154 |
| 5,606,627 | 2/1997 | Kuo | 382/154 |

OTHER PUBLICATIONS

Brown, Rigorous Imagery Reshaping with Digital Photogrammetric Workstation, Mar. 1995, pp. 465–471, ACSM/ASPRS.

Hanaizumi et al., An Automated Method for Estimating Terrain Height from SPOT Stereo Pair Images, 1995, pp. 2167–2169, IGARSS '95, v. 3.

Chen et al., A Unified Solution for Digital Terrain Model and Orthoimage Generation from SPOT Stereopairs, Nov. 1993, pp. 1243–1252, IEEE Trans. on Geoscience and Remote Sensing, v. 31, No. 6.

Wei et al., A Complete Two–Plane Camera Calibration and Experimental Comparison, Apr. 1993, pp. 439–446, Computer Vision, 4th Intl. Conf.

Publication, "Rigorous Imagery Reshaping with DPW" Roger Brown, pp. 465–471, 1995.

Primary Examiner—Amelia Au
Assistant Examiner—Timothy M. Johnson
Attorney, Agent, or Firm—Luther A. Marsh

[57] ABSTRACT

A method for rigorously reshaping a pair of overlapping digital images using a Digital Photogrammetric Workstation (DPW) is disclosed. The overlapping images are imported into the DPW as a pair of originally distorted images having an associated sensor model. The original images are triangulated to adjust sensor parameters. Orthophotos are created with a flat digital terrain matrix (DTM) to leave terrain displacements within themselves, and according to a sensor model and formula for exact projective computations. The orthophotos are aligned by rotation, and interior orientation coordinates of the equivalent vertical frame images are determined. The orthophotos are imported as a pair of overlapping equivalent vertical frame images according to the interior orientation coordinates. A digital terrain model is generated in the DPW using the overlapping equivalent vertical frame images. Another orthophoto is produced using the digital terrain model to remove the measured terrain displacements. In an alternative embodiment, the equivalent vertical frame images are aligned by using the classical pair-wise rectification method or by separately rotating each image without aligning the orthophotos by rotation during their creation. In each embodiment, the sensor model of the original distorted images is dissociated from the orthophotos for subsequently greater distribution and usage of the stereo imagery.

18 Claims, 5 Drawing Sheets

METHOD FOR RIGOROUS RESHAPING OF STEREO IMAGERY WITH DIGITAL PHOTOGRAMMETRIC WORKSTATION

CROSS REFERENCE TO RELATED APPLICATION

This application is a Continuation-In-Part of U.S. patent application Ser. No. 08/856,430 filed May 14, 1997.

BACKGROUND OF THE INVENTION

1. Field of the Invention

The invention generally relates to the processing of stereo imagery by using a Digital Photogrammetric Workstation (DPW), and more particularly, to a method of rigorously reshaping an overlapping pair of digital images through utilization of the workstation.

2. Description of the Prior Art

The human visual system perceives terrain depth when it fuses an overlapping pair of reshaped images, one seen in each eye, with parallax or the distance between common points (different projective geometry from overlapping reshaped image planes). When viewing digital imagery produced by a sensor, it is likewise important to reshape or rectify distorted overlapping images. Such reshaping removes geometrical distortions from the images to permit accurate visualization of objects in a three-dimensional coordinate frame, and prevents incorrect measurement of terrain elevations from the originally distorted images.

Conventionally, a polynomial rectification procedure (i.e., 6- or 8-parameter linear transformation) is utilized to geometrically transform an overlapping pair of originally distorted images into an overlapping pair of reshaped images. Polynomial rectification removes distortions by sampling the images so that they become uniform in scale and aligned for stereo viewing.

However, polynomial rectification does not completely correct the geometrical image distortions caused by interior and exterior orientations of the sensor, and by terrain relief displacements. Specifically, conventional polynomial rectification can only approximate the formula for a model that represents the physical characteristics of the sensor (optics, focal length, scan mechanisms, others) to produce computations for a ground-to-image transformation. As a result, the usefulness of the reshaped images produced by the conventional polynomial rectification process is limited because the approximations are geometrically imprecise.

A Digital Terrain Matrix (DTM) is a representation of the image data in the form of a two-dimensional array of elevation or vertical distance data points, generated from the stereo geometry of the reshaped imagery. The accuracy of a DTM produced from conventionally processed data is thus adversely affected by the limitations of such conventional processes.

Finally, conventional image rectification cannot mask the sensor source of the original images. As a result, the identity of the imagery source may be discovered by analysis of the sensor model associated with the original images. It is therefore undesirable to distribute rectified images when the identity of the sensor source is confidential.

FIG. 1 illustrates in greater detail the steps for performing conventional processing of an overlapping pair of originally distorted images in a Digital Photogrammetric Workstation (DPW). Specifically, the original images produced by a sensor and the associated sensor model are imported into a Digital Photo(rammetric Workstation (DPW) at step 10.

Various known techniques are utilized to import the original images. The technique employed depends on the type of sensor model associated with the originally distorted images (e.g., Frame, Electro-Optical, Panoramic, LandSat, Satellite Platform Observing Terrain, Synthetic Aperture Radar). The DPW creates a corresponding support file that describes estimated sensor model parameters for the interior and exterior orientation for each of the original images. The images are then subjected to a triangulation in step 20 to adjust sensor parameters of interior and exterior orientation. Thereafter, the digital images are pair-wise rectified in step 30 to geometrically reshape the images into an overlapping pair of linear-rectified images thereby creating stereo imagery. The linear-rectified images then undergo stereo compilation in step 40 to generate a Digital Terrain Matrix (DTM) of vertical distances. Derivation of the vertical distances is achieved by measuring parallax or the distance between common points within each reshaped image, from different horizontal displacements caused by terrain elevation. Thereafter, a final orthophoto is created by using the DTM to remove the measured terrain elevation displacements. The described arrangement suffers from the differences noted above.

SUMMARY OF THE INVENTION

It is, therefore, an object of the invention to provide a process for rigorous reshaping of digital imagery to more accurately remove geometrical image distortions and relief displacements.

It is another object of the invention to provide a process for rigorously reshaping an overlapping pair of digital images to mask the sensor source.

In an exemplary embodiment, the invention comprises a method for reshaping an overlapping pair of originally distorted images according to a sensor model which uses an exact formula of projective computations for the ground-to-image transformation. In one such embodiment, the reshaped images are aligned while creating orthophotos as a pair of equivalent vertical frame images. In another embodiment of the invention, the reshaped images are aligned after they are brought back into a Digital Photogrammetric Workstation (DPW) as equivalent vertical frame imagery. In each embodiment, the sensor model of the original distorted images is dissociated from the reshaped images. Interior orientation coordinates for each of the equivalent vertical frame images are determined based on information contained within an image support file. Such a file is created by the DPW when the overlapping pair of digital images is initially brought into the DPW for producing the orthophotos.

Other features and advantages of the invention will become apparent upon reference to the following Description of the Preferred Embodiments when read in light of the attached drawings.

BRIEF DESCRIPTION OF THE DRAWINGS

The present invention will be more clearly understood from the following description in conjunction with the accompanying drawings, where.

DESCRIPTION OF THE INVENTION

Figure 1:
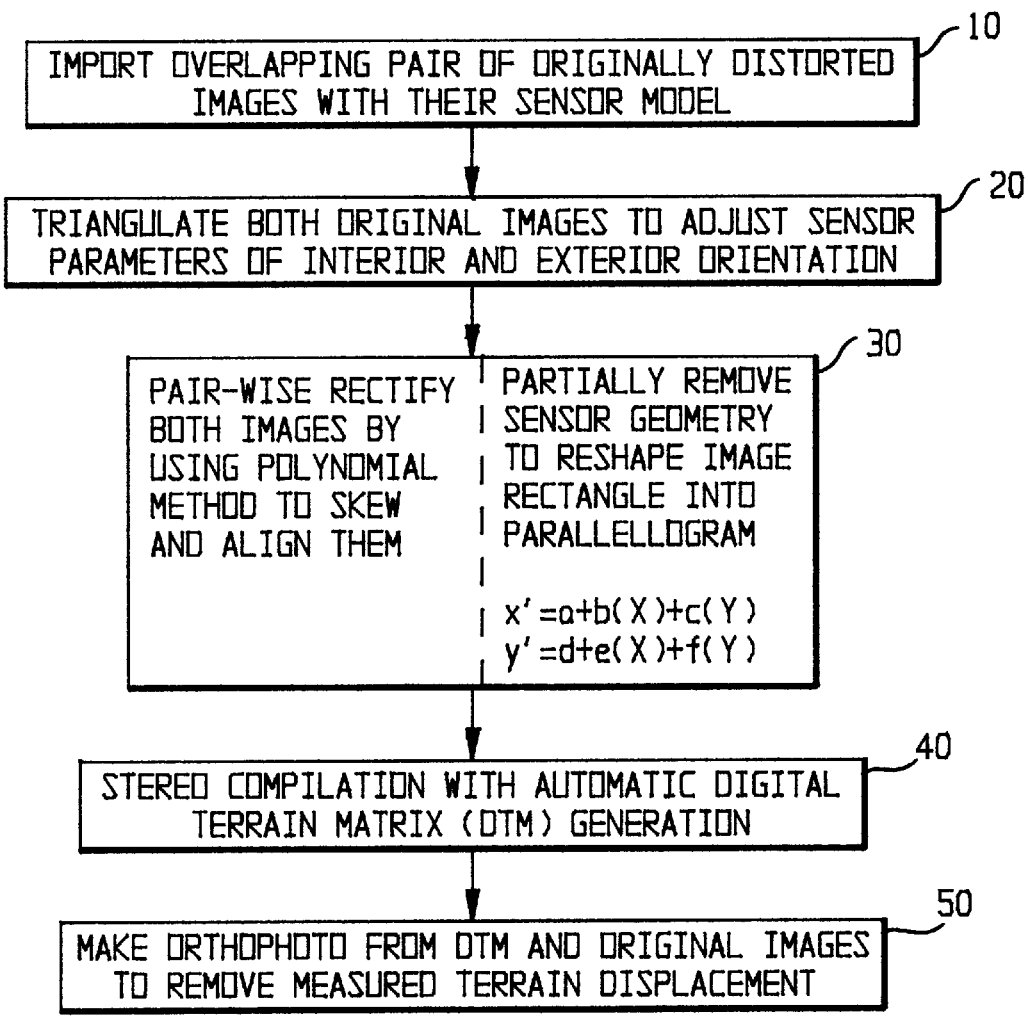
FIG. 1 is a flowchart describing the operation of conventional image rectification methods employing a DPW.
Figure 2:
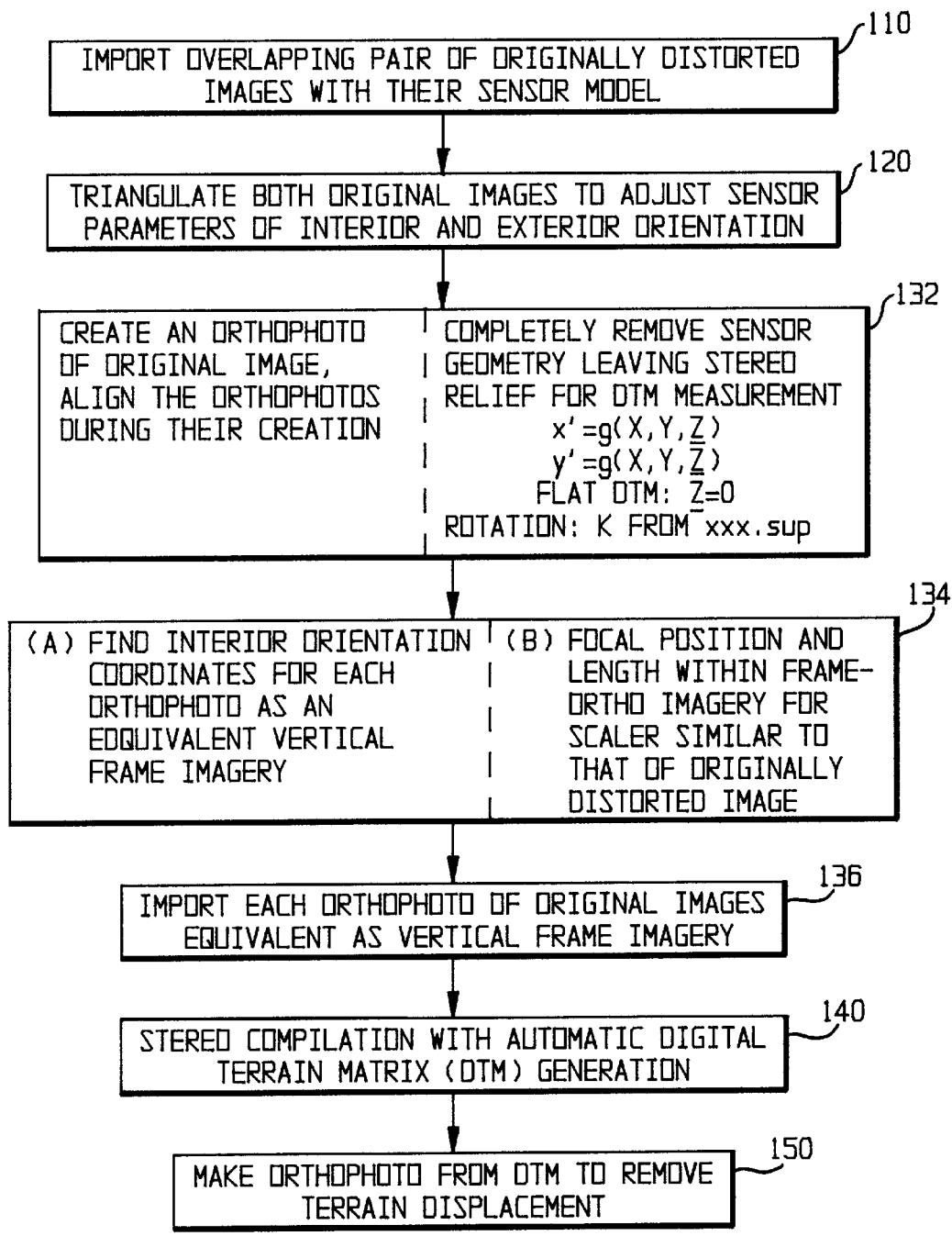
FIG. 2 is a flowchart describing the operation of a rigorous image reshaping process employing a DPW according to a first embodiment of the invention.

A first exemplary embodiment of the invention is shown in FIG. 2. Steps 110, 120, 140, and 150 of FIG. 2 respectively correspond to steps 10, 20, 40, and 50 of FIG. 1. However, in the embodiment of FIG. 2, steps 132, 134, and 136 are substituted for step 30 of FIG. 1. In accordance with the invention, an orthophoto of each originally distorted image is created in step 132 according to a model and formula that corresponds with the sensor producing the original images. The orthophoto is produced using a flat Digital Terrain Matrix (DTM) by setting the Z-coordinates to a constant value of zero. The orthophotos are also aligned in step 132 according to a rotation factor, K in radians. Accordingly, the orthophoto produced uses an exact formula for projective computations by the orthophoto feature of the DPW. This accurately removes geometrical sensor distortions but it leaves terrain elevation displacements from the originally distorted image.

Figure 4:
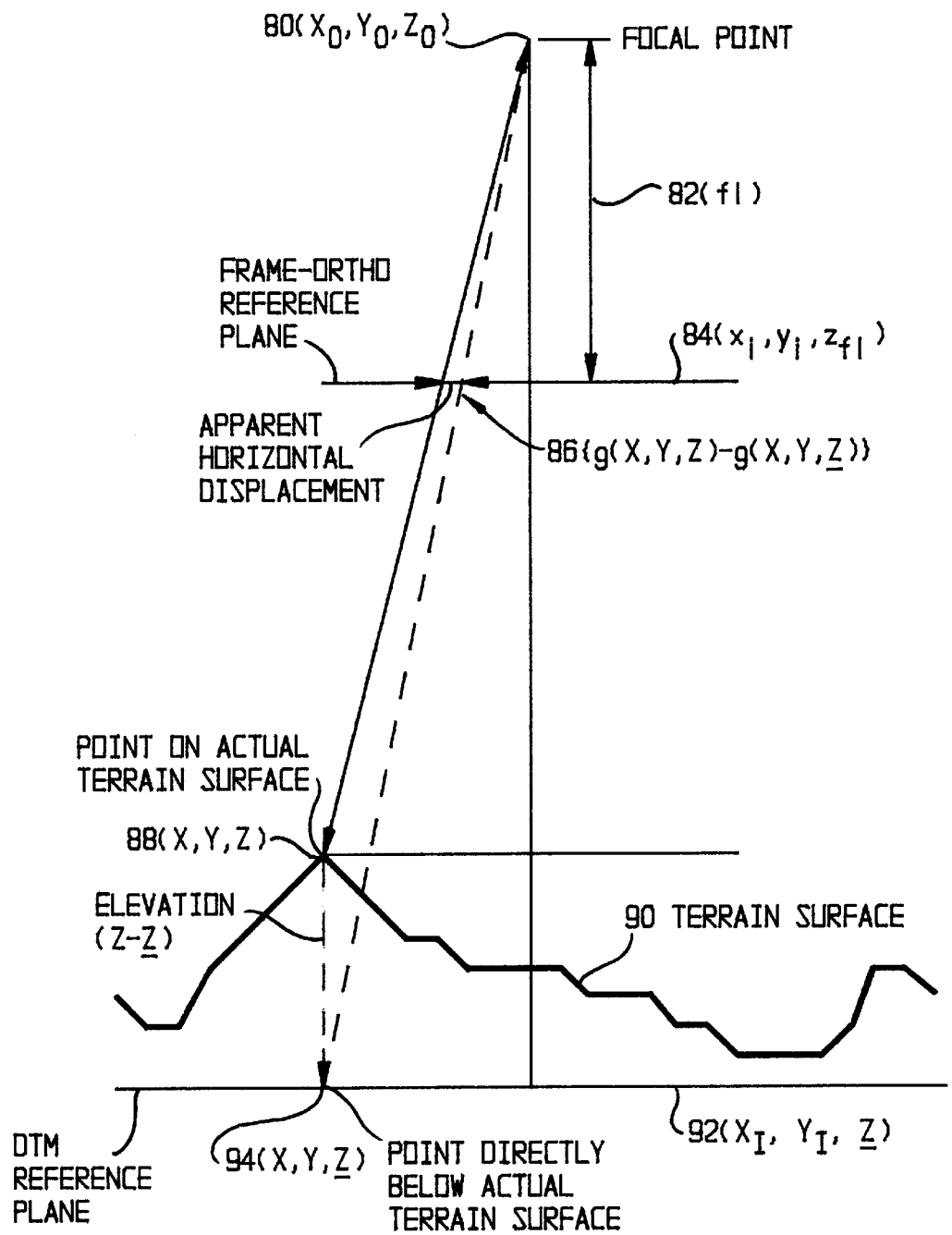
FIG. 4 is a schematic illustration of the terrain in side view for explaining the equivalent vertical frame image geometry.

FIG. 4 illustrates the relative position of a frame-ortho reference plane 84 with respect to the DTM reference plane 92 parallel thereto, a DTM surface (or terrain) 90, and a sensor focal point 80. FIG. 4 also shows the terrain elevation as a difference between the Z-coordinate of a point 88 on the DTM surface 90 and the $\underline{Z}$-coordinate of a point 94 on the DTM reference plane 92. The apparent horizontal displacement 86 between points 88 and 94 appears in the reference plane 84 of equivalent vertical frame-ortho images. The point 88 on the terrain has a Z-coordinate value different than the assumed $\underline{Z}$-coordinate value of the reference point 94 when the pair of equivalent vertical frame-ortho images are created. In accordance with the invention, the rigorous imagery reshaping process herein described projects the originally distorted images (not shown) with a ground-to-image formula from the sensor model onto thE frame-ortho reference plane 84 that is parallel to the flat DTM reference plane 92.

Figure 5:
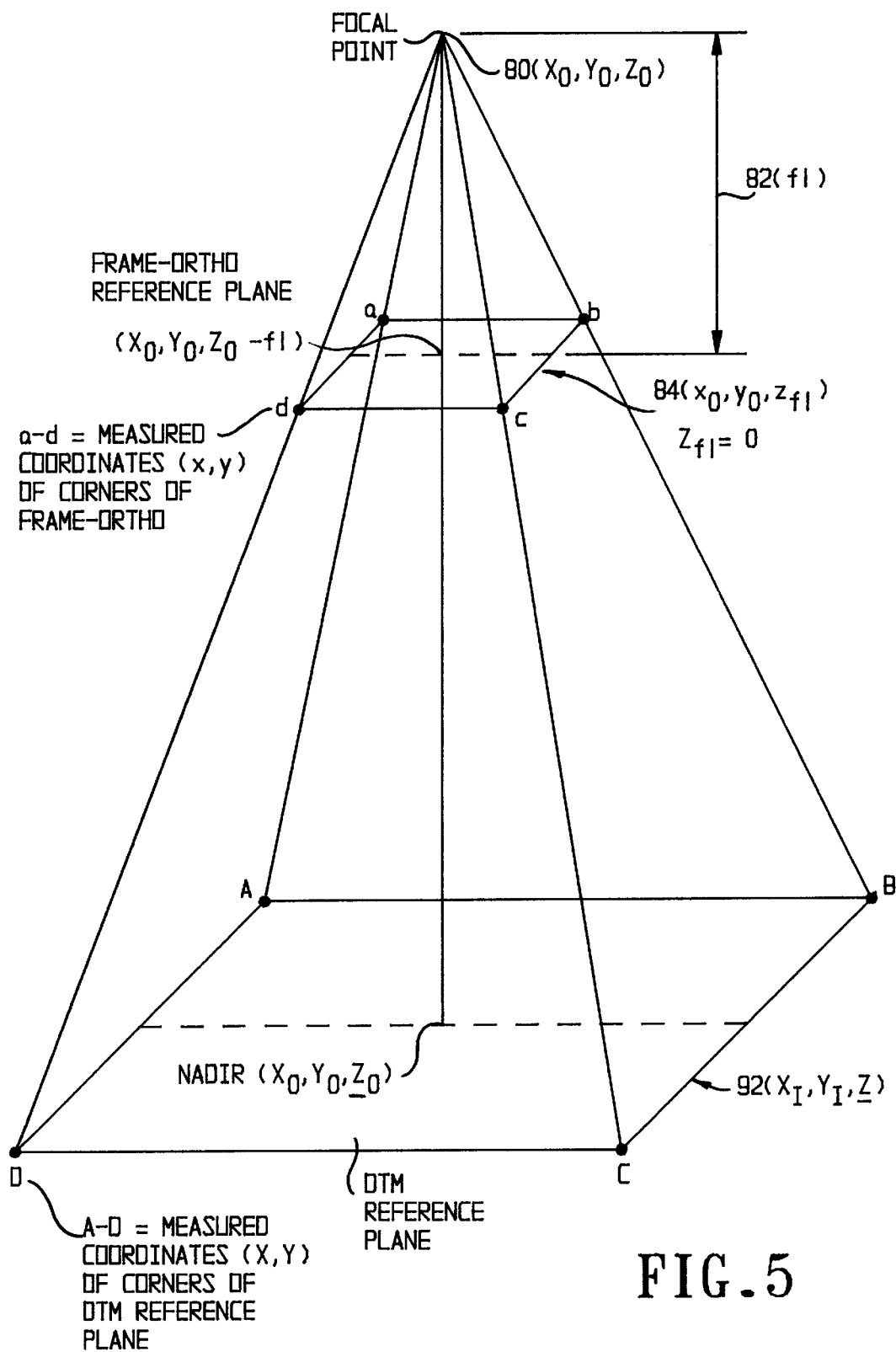
FIG. 5 is a schematic illustration in perspective for explaining the equivalent vertical frame image geometry.

FIG. 5 illustrates coordinates $(X_o, Y_o, Z_o)$ of the focal point 80, the DTM reference plane coordinates 94 $(X_I, Y_I, Z_I,)$ with the corresponding corner points, A, B, C, and D of the created orthophotos; frame-ortho reference plane 84, with corresponding corner points a, b, c, d in each equivalent vertical frame-ortho image and corresponding interior orientation coordinates $x_i$, $y_i$, $z_{fl}$ (where i=a, b, c, or d, and $z_{fl}$=negative focal length) of the corner points a, b, c, and d with respect to the focal position 80 in each equivalent vertical frame-ortho image.

As a result of the invention, a more accurate DTM terrain surface 90 (FIG. 4) is generated by the known parallax measurement method that finds and uses the related g(X, Y, Z) position each of the equivalent vertical frame-ortho images. The details of the parallax measurement are omitted since they are well known in the art. The horizontal offset 86, that is determined by subtracting the transformed DTM reference point 94 (X, Y, $\underline{Z}$) from the transformed DTM elevation point 88 (X, Y, Z), i.e., g()=g(X, Y, Z)–g(X, Y, $\underline{Z}$), where g() represents formula for the ground-to-image transformation, where g() affects the measurement of parallax between both images and accordingly affects the measurement of the elevation on the ground.

After making a pair of orthophotos from each original image, the four corner points a, b, c, and d of each equivalent vertical frame-ortho image on the frame-ortho reference plane 84 (FIG. 5) are determined and input into the DPW. Interior coordinates $x_i$ and $y_i$ of the corner points a, b, c, and d are calculated in step 134 according to the following equations:

$$x_1 = S(X_1 - X_0) = S(\text{FOOTPRINT}(X_1) - \text{LSRCAMERA}(X_0)); \text{ and}$$

$$y_1 = S(Y_1 - Y_0) = S(\text{FOOTPRINT}(Y_1) - \text{LSRCAMERA}(Y_0))$$

wherein $$S = fl / (\text{LSRCAMERA}(Z_0) - \underline{Z})$$

where:

FOOTPRINT($X_1$) and FOOTPRINT($Y_1$) are the measured X and Y coordinates of each corner point in the Cartesian local-space-rectangular frame for the flat DTM reference plane of FIG. 5, and $x_1$ and $y_1$ are the corresponding derived corner points for the equivalent vertical frame-ortho image plane of FIG. 5, where its image plane is parallel to the flat terrain matrix forming the reference plane 92;

fl is the desired focal length of the equivalent vertical-ortho frame image, that matches the actual focal length of the other actual sensor model for each originally distorted image, LSRCAMERA($X_0$), LSRCAMERA($Y_0$), and LSRCAMERA($Z_0$)–$\underline{Z}$ are the actual determined X, Y, and Z coordinates of the focal point position from the originally distorted image, where determining that actual focal length and its position is impertinent to this invention, S is an image scalar, depending on the desired focal length, fl, and determined Z focal position with respect to the flat DTM elevation of $\underline{Z}$, LSRCAMERA($Z_0$)–$\underline{Z}$, for the equivalent vertical frame-ortho image, matching the focal length and focal position when the originally distorted image was exposed, where the image scalar should approximate that of the originally distorted image to resolve the remaining terrain displacements left within the equivalent vertical frame-ortho image.

In the equations, the image scalar (S) is obtained by dividing the focal length 82 (fl) by the DTM reference plane coordinate $Z_0$ of the focal point 80 (LSRCAMERA($Z_0$)) minus the flat DTM elevation $\underline{Z}$. The frame-ortho reference plane $x_i$ and $y_i$ coordinates 84 are obtained by subtracting the respective DTM reference plane $X_0$ and $Y_0$ coordinates 92 of the focal point 80 (LSRCAMERA($X_0$) and LSRCAMERA($Y_0$)) from the DTM reference plane $X_i$, Y, and $\underline{Z}$ coordinates 92 (where I=A, B, C, and D, and Z=$\underline{Z}$) for the four corner points A, B, C, and D of the equivalent vertical frame-ortho image in the flat DTM reference plane 92 (FOOT PRINT($X_I$) and FOOTPRINT($Y_I$)), and then scaled (multiplied) by the image scalar (S). The DTM reference plane $X_I$ and $Y_I$ coordinates 92 of the corner points A, B, C, and D, and the DTM reference plane coordinates $X_0$ and $Y_0$ of the focal point 80, and the focal length 82 (fl), can be obtained or derived from data contained in the respective supporting file for each equivalent vertical frame image.

Unlike the conventional linear-rectified images, the orthophotos produced in step 132 are dissociated from the sensor model of the original distorted images. Accordingly, after the determining the interior orientation coordinates ($N_i$, $Y_i$) for each of the equivalent vertical frame images in step 134, and finding the focal position and length within the frame-ortho imagery for a scalar similar to that of the originally distorted image. It is important to note that the scalar is similar to that of the originally distorted image as is familiar to those of ordinary skill in the art. In this context, similar means where the focal length and position are of the same order of magnitude of the focal length and position of the originally distorted image. In otherwords, the focal length and position are equal to, or equivalent to, the actual focal length of position of the originally distorted image when it was exposed. If a fixed focal length occurs in the originally exposed image, that same focal length is used in the calculation, likewise if a scanner is used, the focal length of the scanner focal length is used in the calculation. The orthophotos are then imported at step 136 back into the DPW as a pair of equivalent vertical frame images. Step 136 provides the necessary sensor model parameters determined in step 134 to continue with the stereo compilation at step 140. Step 136 also prevents the derivation of the imagery source by allowing the sensor model of the equivalent vertical frame images to replace the dissociated sensor model of the original images, thereby disguising the sensor source and identity of the original images.

The alignment of the reshaped images, before stereo compilation, can be accomplished by either rotating the orthophotos while creating them at the DPW, or by aligning the equivalent vertical frame images after they are brought back into the DPW and then pair-wise rectifying them by using normal DPW processes. In the embodiment shown in FIG. 2, the alignment is achieved in step 132 by rotating the orthophotos according to a rotation factor K in radians while creating them and prior to bringing them back into the DPW in step 136.

Figure 3:
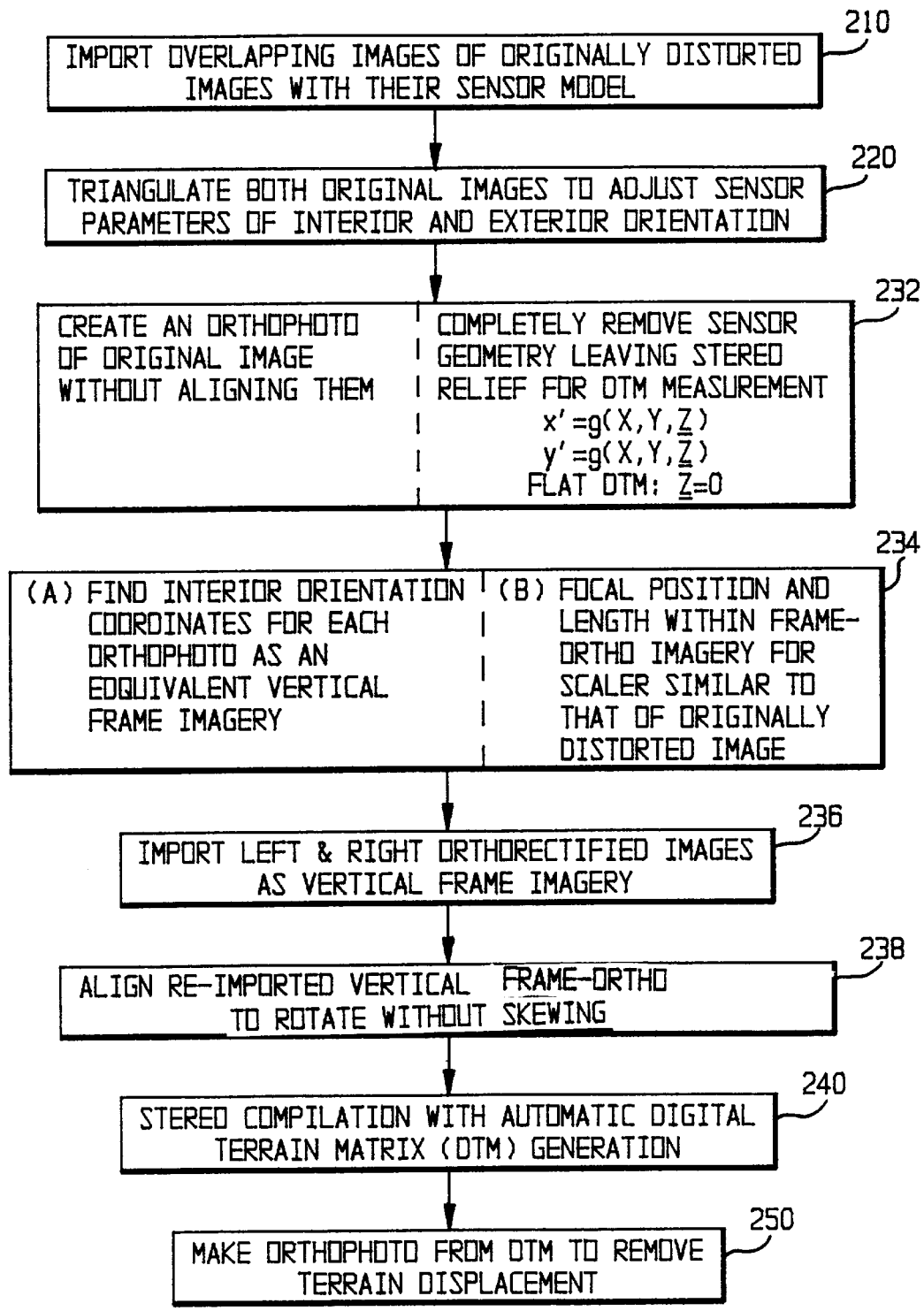
FIG. 3 is a flowchart describing the operation of a rigorous image reshaping process employing a DPW according to a second embodiment of the invention.

By contrast, in the embodiment of FIG. 3, the alignment is absent from the step 232. Instead, the alignment step 238 is accomplished by rotating the equivalent vertical frame images with the pair-wise rectification function of the DPW after they are brought back into the DPW in step 236. The image processing steps 210, 220, 234, 236, 240, and 250 shown in FIG. 3, respectively correspond to the image processing steps 110, 120, 134, 136, and 150 of FIG. 2.

There has thus been described a method of reshaping digital images using a Digital Photogrammetric Workstation where the reshaped images have improved stereo accuracy, and they are secure by being free of sensor model information about the original images.

While particular embodiments of the present invention have been shown and described, it will be apparent to those skilled in the art that various changes and modifications may be made therein without departing from the spirit or scope of the invention. Accordingly, it is intended that the appended claims cover such changes and modifications that come within the spirit and scope of the invention.

What is claimed is:

1. A method for reshaping of a pair of overlapping digital images using a Digital Photogrammetric Workstation (DPW), said method comprising the steps of:

importing said digital images into said DPW as an overlapping-pair of originally distorted images having an associated sensor model;

triangulating said distorted images in said DPW to adjust sensor parameters within said distorted images;

creating orthophotos as a pair of equivalent vertical frame images from said distorted images according to a sensor model and formula of exact projective computations onto a flat terrain matrix reference plane and rotating said distorted images for alignment during said creating step;

determining interior orientation coordinates for each equivalent vertical frame image plane of said orthophotos, and finding a focal position and length of the frame-ortho image that creates a scalar similar to the scalar of the originally distorted image;

importing said orthophotos as a pair of overlapping equivalent vertical frame images according to said interior orientation coordinates;

generating a digital terrain matrix in said DPW using said equivalent vertical frame images; and creating an orthophoto using said digital terrain matrix to remove measured terrain displacement, wherein said determining step comprises calculating said interior orientation coordinates according to following equations $$x_i = S(X_I - X_0) = S(\text{FOOTPRINT}(X_I) - \text{LSRCAMERA}(X_0)); \text{ and}$$

$$y_i = S(Y_I - Y_0) = S(\text{FOOTPRINT}(Y_I) - \text{LSRCAMERA}(Y_0)),$$

wherein $$S = f1/(\text{LSRCAMERA}(Z_0) - \underline{Z})$$

where:

FOOTPRINT ($X_I$) and FOOTPRINT ($Y_I$) are the measured X and Y coordinates of each corner point in Cartesian coordinates of the terrain matrix reference plane of and $x_i$ and $y_i$ are the corresponding corner points derived for the equivalent vertical frame-ortho image plane, where each image plane is parallel to the flat DTM reference plane;

LSRCAMERA ($X_o$) LSRCAMERA ($Y_o$) and LSRCAMERA ($Z_o$) are actual determined X, Y and Z coordinates of a focal position from the originally distorted image;

fl is a desired focal length of the equivalent vertical frame-ortho image that matches the actual focal length of the actual sensor marked for each originally distorted image when each was exposed; and S is an image scalar, which depends on the desired focal length and determined focal position with respect to the flat DTM elevation of $\underline{Z}$, LSRCAMERA ($Z_0$)–$\underline{Z}$ in the equivalent vertical frame-ortho image, where the image scalar approximates that of the originally distorted image to resolve the remaining terrain displacements left within the equivalent vertical frame-ortho image.

2. The method of claim 1, wherein said determining step comprises calculating said interior orientation coordinates according to following equations:

$$x_i = S(X_I - X_0) = S(\text{FOOTPRINT}(X_I) - \text{LSRCAMERA}(X_0)); \text{ and}$$

$$y_i = S(Y_I - Y_0) = S(\text{FOOTPRINT}(Y_I) - \text{LSRCAMERA}(Y_0)),$$

wherein $$S = f1/(\text{LSRCAMERA}(Z_0) - \underline{Z})$$

where:

FOOTPRINT ($X_I$) and FOOTPRINT ($Y_I$) are the measured X and Y coordinates of each corner point in Cartesian coordinates of the terrain matrix reference plane of and $x_i$ and $y_i$ are the corresponding corner points derived for the equivalent vertical frame-ortho image plane, where each image plane is parallel to the flat DTM reference plane;

LSRCAMERA ($X_o$) LSRCAMERA ($Y_o$) and LSRCAMERA ($Z_o$) are actual determined X, Y and Z coordinates of a focal position from the originally distorted image;

fl is a desired focal length of the equivalent vertical frame-ortho image that matches the actual focal length of the actual sensor marked for each originally distorted image when each was exposed; and S is an image scalar, which depends on the desired focal length and determined focal position with respect to the flat DTM elevation of $\underline{Z}$, LSRCAMERA ($Z_0$)–$\underline{Z}$ in the equivalent vertical frame-ortho image, where the image scalar approximates that of the originally distorted image to resolve the remaining terrain displacements left within the equivalent vertical frame-ortho image.

3. A method for rigorous reshaping pairs of digital images by using a Digital Photogrammetric Workstation (DPW) to create imagery for stereo compilation, said method comprising the steps of:

importing said digital images into said DPW as an overlapping-pair of originally distorted images having an associated sensor model;

triangulating said distorted images in said DPW to adjust sensor parameters within those images;

creating orthophotos as a pair of equivalent vertical frame images from said distorted images according to a sensor model and formula for exact projective computations onto a flat terrain matrix reference plane;

determining interior orientation coordinates for each equivalent vertical frame-ortho image plane of said orthophotos, and finding a focal position and length of the frame-ortho image that creates a scalar similar to the scalar of the originally distorted image;

importing said orthophotos as a pair of overlapping equivalent vertical frame-ortho images according to said interior orientation coordinates;

aligning said equivalent vertical frame images by pair-wise rectification;

generating a digital terrain matrix in said DPW using said equivalent vertical frame-ortho images; and creating an orthophoto using said digital terrain matrix to remove the measured terrain displacement wherein said calculating step determines said interior orientation coordinates according to the following equations:

$x_i = S(X_I - X_0) = S(\text{FOOTPRINT}(X_I) - \text{LSRCAMERA}(X_0))$; and $y_i = S(Y_I - Y_0) = S(\text{FOOTPRINT}(Y_I) - \text{LSRCAMERA}(Y_0))$, wherein $S = f1/(\text{LSRCAMERA}(Z_0) - \underline{Z})$ where:

FOOTPRINT ($X_I$) and FOOTPRINT ($Y_I$) are the measured X and Y coordinates of each corner point in Cartesian local-space-rectangular frame for the flat DTM reference plane and $x_i$ and $y_i$ are the corresponding derived corner points for the equivalent vertical frame-ortho image reference plane, where each image plane is parallel to the flat terrain matrix forming the flat DTM reference plane;

LSRCAMERA ($X_o$) LSRCAMERA ($Y_o$) and LSRCAMERA ($Z_o$) are the actual determined X, Y and Z coordinates of the focal point position from the originally distorted image; the reference plane;

fl is a desired focal length of the equivalent vertical frame-ortho image that matches the actual focal length of the actual sensor marked for each originally distorted image when each was exposed; and S is an image scalar, which depends on the desired focal length arid determined focal position with respect to the flat DTM elevation of $\underline{Z}$, LSRCAMERA ($Z_0$)–$\underline{Z}$ in the equivalent vertical frame-ortho image, where the image scalar approximates that of the originally distorted image to resolve the remaining terrain displacements left within the equivalent vertical frame-ortho image.

4. The method of claim 3, wherein said calculating step determines said interior orientation coordinates according to the following equations:

$x_i = S(X_I - X_0) = S(\text{FOOTPRINT}(X_I) - \text{LSRCAMERA}(X_0))$; and $y_i = S(Y_I - Y_0) = S(\text{FOOTPRINT}(Y_I) - \text{LSRCAMERA}(Y_0))$, wherein $S = f1/(\text{LSRCAMERA}(Z_0) - \underline{Z})$ where:

FOOTPRINT ($X_I$) and FOOTPRINT ($Y_I$) are the measured X and Y coordinates of each corner point in Cartesian local-space-rectangular frame for the flat DTM reference plane and $x_i$ and $y_i$ are the corresponding derived corner points for the equivalent vertical frame-ortho image reference plane, where each image plane is parallel to the flat terrain matrix forming the flat DTM reference plane;

LSRCAMERA ($X_o$) LSRCAMERA ($Y_o$) and LSRCAMERA ($Z_o$) are the actual determined X, Y and Z coordinates of the focal point position from the originally distorted image; the reference plane;

fl is a desired focal length of the equivalent vertical frame-ortho image that matches the actual focal length of the actual sensor marked for each originally distorted image when each was exposed; and S is an image scalar, which depends on the desired focal length and determined focal position with respect to the flat DTM elevation of $\underline{Z}$, LSRCAMERA ($Z_0$)–$\underline{Z}$ in the equivalent vertical frame-ortho image, where the image scalar approximates that of the originally distorted image to resolve the remaining terrain displacements left within the equivalent vertical frame-ortho image.

5. The method of claim 3, wherein the alignment step includes rotating the orthophotos during their creation, or after their creation as equivalent vertical frame images.

6. The method of claim 3, wherein importing the said orthophotos according to said coordinates produces a pair of overlapping equivalent vertical frame images.

7. The method of claim 3, wherein said aligning step comprises pair-wise rectifying of the said equivalent vertical frame-ortho images.

8. The method of claim 3, further comprising producing an orthophoto using said flat digital terrain matrix.

9. A method for reshaping an overlapping pair of digital images produced by a sensor model having the corresponding formula in a digital photogrammetric workstation comprising the steps of:

importing said digital images into the workstation as an overlapping pair of originally distorted images;

triangulating said distorted images to adjust sensor parameters within them;

creating orthophotos as a pair of equivalent vertical frame images from said distorted images according to the sensor model and formula for exact projective computations onto a flat terrain matrix reference plane;

determining interior orientation coordinates for each equivalent vertical frame-ortho image reference plane of said orthophotos, and finding a focal position arid length of the frame-ortho image that matches a scalar similar to the scalar of the originally distorted image;

importing said orthophots as a pair of overlapping equivalent vertical frame-ortho images according to said interior orientation coordinates;

aligning both of said distorted images by calculating the separate rotation of each during said creating step and before said importing as equivalent vertical frame-ortho images separately rotate the images for alignment; and generating a digital terrain matrix in said digital photogrammetric workstation using said equivalent vertical and rotated frame-ortho images wherein determining interior orientation coordinates of said equivalent vertical frame images comprises employing said coordinates in the orthophoto production step that produces the equivalent vertical frame-ortho image according to the following equations:

$$x_i = S(X_I - X_0) = S(FOOTPRINT(X_I) - LSRCAMERA(X_0)); \text{ and}$$

$$y_i = S(Y_I - Y_0) = S(FOOTPRINT(Y_I) - LSRCAMERA(Y_0)),$$

wherein $$S = f1/(LSRCAMERA(Z_0) - \underline{Z})$$

where:

FOOTPRINT ($X_I$) and FOOTPRINT ($Y_I$) are the measured X and Y coordinates of each corner point in the Cartesian local-space-rectangular frame for the flat DTM reference plane, of and $x_i$ and $y_i$ are the corresponding derived corner points for the equivalent vertical frame-ortho image reference plane, where that image plane is parallel to the flat terrain matrix forming the flat DTM reference plane;

f1 is the desired focal length of the equivalent vertical frame-ortho frame image that matches the actual focal length of the actual sensor model for each originally distorted image when each was exposed;

LSRCAMERA ($X_o$) LSRCAMERA ($Y_o$) and LSRCAMERA ($Z_o$) are the actual determined X, Y and Z coordinates of the focal point position from the originally distorted image;

S is an image scalar, which depends on the desired focal length, f1, and determined focal position with respect to the flat DTM elevation of $\underline{Z}$, LSRCAMERA ($Z_0$)–$\underline{Z}$ in the equivalent vertical frame-ortho image, where the image scalar approximates that of the originally distorted image to resolve the remaining terrain displacements left within the equivalent vertical frame-ortho image.

10. The method of claim 9, wherein determining interior orientation coordinates of said equivalent vertical frame images comprises employing said coordinates in the orthophoto production step that produces the equivalent vertical frame-ortho image according to the following equations:

$$x_i = S(X_I - X_0) = S(FOOTPRINT(X_I) - LSRCAMERA(X_0)); \text{ and}$$

$$y_i = S(Y_I - Y_0) = S(FOOTPRINT(Y_1) - LSRCAMERA(Y_0)),$$

wherein $$S = f1/(LSRCAMERA(Z_0) - \underline{Z})$$

where:

FOOTPRINT ($X_I$) and FOOTPRINT ($Y_I$) are the measured X and Y coordinates of each corner point in the Cartesian local-space-rectangular frame for the flat DTM reference plane, of and $x_i$ and $y_i$ are the corresponding derived corner points for the equivalent vertical frame-ortho image reference plane, where that image plane is parallel to the flat terrain matrix forming the flat DTM reference plane;

f1 is the desired focal length of the equivalent vertical frame-ortho frame image that matches the actual focal length of the actual sensor model for each originally distorted image when each was exposed;

LSRCAMERA ($X_o$) LSRCAMERA ($Y_o$) and LSRCAMERA ($Z_o$) are the actual determined X, Y and Z coordinates of the focal point position from the originally distorted image;

S is an image scalar, which depends on the desired focal length, f1, and determined focal position with respect to the flat DTM elevation of $\underline{Z}$. LSRCAMERA ($Z_0$)–$\underline{Z}$ in the equivalent vertical frame-ortho image, where the image scalar approximates that of the originally distorted image to resolve the remaining terrain displacements left within the equivalent vertical frame-ortho image.

11. The method of claim 9, wherein the alignment step includes rotating the orthophotos during their creation or after their creation as equivalent vertical frame images.

12. The method of claim 9, wherein importing the said orthophotos according to said coordinates produces a pair of overlapping equivalent vertical frame images.

13. The method of claim 9, wherein said aligning step comprises separately rotating said orthophotos during their creation.

14. The method of claim 9, further comprising producing an orthophoto using said flat digital terrain matrix.

15. The method of claim 9, further comprising removing terrain displacement from said equivalent vertical frame images.

16. A method for removing sensor source and original image in formation from reshaped digital images using a digital photogrammetric workstation comprising the steps of:

importing said digital images into said workstation as an overlapping pair of orthophotos produced by an associated sensor model of the originally distorted images;

triangulating the said distorted images in said workstation to adjust their sensor parameters;

creating orthophotos as a pair of equivalent vertical frame images from said distorted images according to a sensor model and formula for exact projective computations onto a flat terrain matrix reference plane;

determining interior orientation coordinates for each equivalent vertical frame image plane of said orthophotos, and finding a focal position and length of the frame-ortho image that creates a scalar similar to the scalar of the originally distorted image;

importing said orthophotos as an pair of overlapping and equivalent vertical frame-ortho images according to said interior orientation coordinates;

aligning said distorted images during said orthophotos creating step or aligning said equivalent vertical frame-ortho images after said triangulating step; and generating a digital terrain matrix from images free of information about the sensor and original imagery wherein determining interior orientation coordinates of said equivalent vertical frame images comprises employing said coordinates in the orthophoto production step that produces the equivalent vertical frame-ortho image according to the following equations:

$$x_i = S(X_I - X_0) = S(\text{FOOTPRINT}(X_I) - \text{LSRCAMERA}(X_0));\text{ and}$$

$$y_i = S(Y_I - Y_0) = S(\text{FOOTPRINT}(Y_I) - \text{LSRCAMERA}(Y_0)),$$

wherein $$S = f1/(\text{LSRCAMERA}(Z_0) - Z)$$

where:

FOOTPRINT ($X_I$) and FOOTPRINT ($Y_I$) are the measured X and Y coordinates of each corner point in the Cartesian local-space-rectangular frame for the flat DTM reference plane, of and $x_i$ and $y_i$ are the corresponding derived corner points for the equivalent vertical frame-ortho image reference plane, where that image plane is parallel to the flat terrain matrix forming the flat DTM reference plane;

f1 is the desired focal length of the equivalent vertical frame-ortho frame image that matches the actual focal length of the actual sensor model for each originally distorted image when each was exposed;

LSRCAMERA ($X_o$) LSRCAMERA ($Y_o$) and LSRCAMERA ($Z_o$) are the actual determined X, Y and Z coordinates of the focal point position from the originally distorted image;

S is an image scalar, which depends on the desired focal length, f1, and determined focal position with respect to the flat DTM elevation of $Z$, LSRCAMERA ($Z_0$)–$Z$ in the equivalent vertical frame-ortho image, where the image scalar approximates that of the originally distorted image to resolve the remaining terrain displacements left within the equivalent vertical frame-ortho image.

17. The method of claim 16, further comprising producing an orthophoto using said flat digital terrain matrix.

18. The method of claim 16, further comprising removing terrain displacement from said aligned images.

* * * * *